United States Patent [19]

Himmelsbach

[11] 4,353,634
[45] Oct. 12, 1982

[54] FOCUSING MECHANISM FOR CAMERA OBJECTIVE

[75] Inventor: Paul Himmelsbach, Bad Kreuznach, Fed. Rep. of Germany

[73] Assignee: Jos. Schneider & Co. Optische Werke Kreuznach, Bad Kreuznach, Fed. Rep. of Germany

[21] Appl. No.: 896,588

[22] Filed: Apr. 14, 1978

[30] Foreign Application Priority Data

Apr. 15, 1977 [DE] Fed. Rep. of Germany ....... 2716679

[51] Int. Cl.³ .......................... G02B 7/10; G03B 3/10
[52] U.S. Cl. .................................. 354/195; 350/255; 350/429
[58] Field of Search ................. 354/25, 195–197; 352/139, 140; 350/187, 255, 429, 430; 355/55; 353/76

[56] References Cited

U.S. PATENT DOCUMENTS

| | | | |
|---|---|---|---|
| 3,482,500 | 12/1969 | Thomas | 354/196 |
| 3,610,733 | 10/1971 | Back | 350/429 X |
| 4,057,327 | 11/1977 | Kumazawa | 354/195 X |
| 4,110,769 | 8/1978 | Schutz et al. | 354/195 |
| 4,200,377 | 4/1980 | Holderbaum | 354/195 |

FOREIGN PATENT DOCUMENTS 1285287 12/1968 Fed. Rep. of Germany ...... 354/195

*Primary Examiner*—John Gonzales
*Attorney, Agent, or Firm*—Karl F. Ross

[57] ABSTRACT

A front component of a varifocal camera objective, axially shiftable for focusing purposes, is provided with a lens mount held by an axially extending guide rod which is slidably received in an inner annular flange and an end wall of a lens barrel. The lens mount has a pin projecting through an axial guide slot in the lens barrel into a camming groove in a surrounding milled setting ring. A rearward extension of the guide rod, nonrotatable but axially slidable with reference thereto against the force of a tension spring, is provided with male threads engaged by a drive nut held captive in the end wall, the nut being provided with outer gear teeth meshing with a pinion which is driven by a reversible electric motor via a slipping clutch. Upon retraction of the threaded extension by the drive nut, the tension spring holds the pin of that lens mount against the rear edge of its camming groove; the width of that groove and the axial length of the guide slot are sufficient to let the motor drive the lens mount over at least part of the available focusing range in a given position of the setting ring.

8 Claims, 1 Drawing Figure

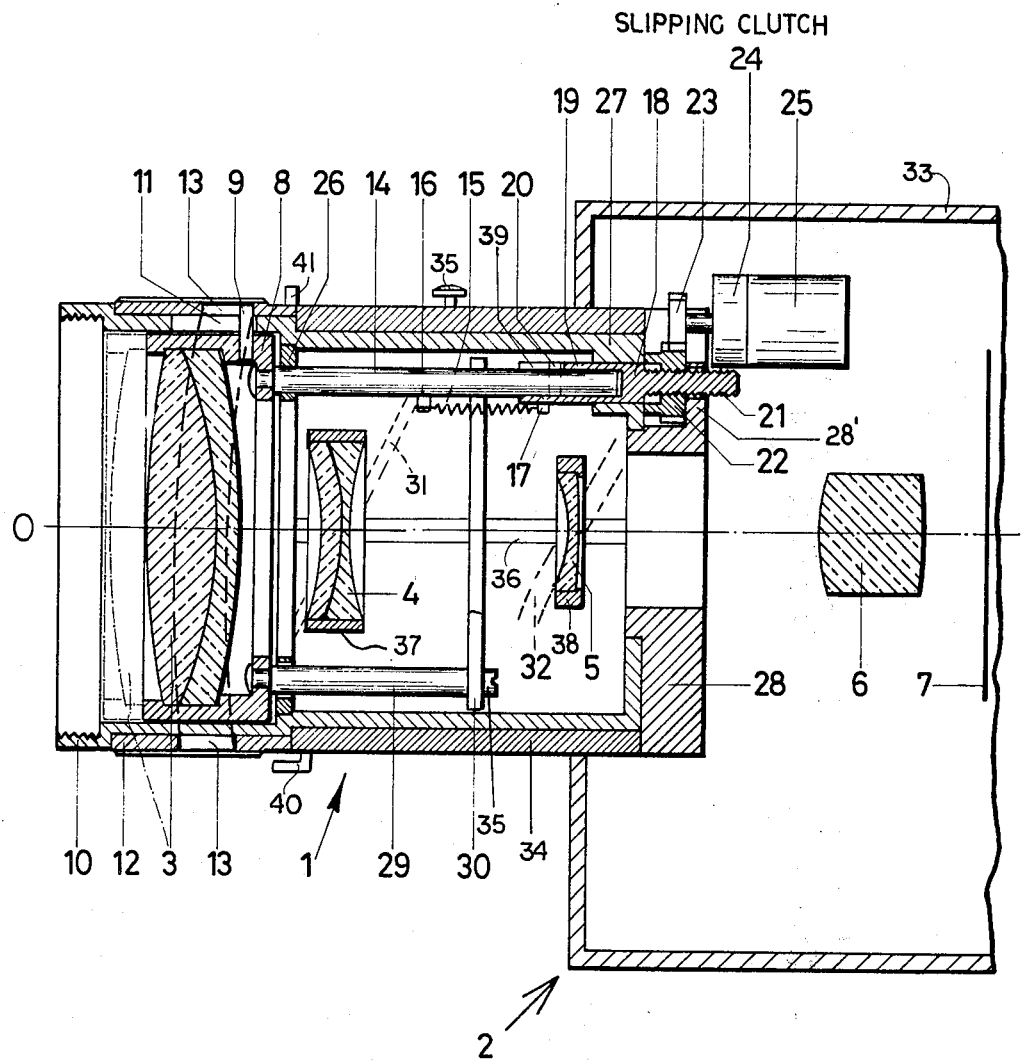

FOCUSING MECHANISM FOR CAMERA OBJECTIVE

FIELD OF THE INVENTION

My present invention relates to a photographic or cinematographic camera whose objective includes one or more lenses that are axially shiftable for focusing purposes.

BACKGROUND OF THE INVENTION

Conventional cameras with focusable objectives are provided with an outer, axially fixed setting ring rotatably mounted on a lens barrel and provided with female threads engaging male threads of an inner guide ring which is held against rotation and is rigid with a lens mount supporting the shiftable lens or lenses, the latter usually constituting a front component of the objective. The two rings are centered on the objective axis and are therefore of a rather large diameter, resulting in considerable friction along their threaded contact surfaces.

In commonly owned U.S. Pat. No. 3,482,500 there has been disclosed a control mechanism for manual and automatic focusing in which a lens mount is supported by several axially extending guide rods, one of these rods having threads engaged by a nut which is integral with the shiftable lens mount. It has also been proposed to provide a shiftable lens support with an axially extending rack engaged by a rotatable worm; see German Pat. No. 1,101,801.

In commonly owned U.S. patent application Ser. No. 894,031, filed Apr. 6, 1978 by Karl-Heinz Holderbaum, now U.S. Pat. No. 4,200,377, there has been disclosed and claimed a focusing mechanism comprising a guide rod which is fastened to a shiftable lens mount and is slidably but nonrotatably held in stationary bearings inside a lens barrel, this guide rod extending parallel to the optical axis of the objective and terminating within a camera housing in a threaded rear extremity which is engaged by a captive drive nut. The nut is provided with external gear teeth in mesh with a motor-driven pinion and also with a manually rotatable toothed wheel, the latter being rigid with a scale-carrying setting ring projecting from the housing. A slipping clutch inserted between the motor and its pinion allows the lens mount to be manually displaced even if the motor is of the self-locking (e.g. stepping) type remaining stationary when not energized. That system is advantageous for its low frictional resistance and for the accurate guidance given to the movable lens mount.

OBJECTS OF THE INVENTION

An object of my present invention is to provide a modified focusing mechanism, generally similar to the above-identified Holderbaum application, which retains the aforementioned advantages of that system while allowing greater flexibility in the positioning of the manually operable setting ring.

Another object is to provide means in such a system for enabling a manual preselection of a distance range and automatic focusing or scanning within that selected range.

SUMMARY OF THE INVENTION

In accordance with my present invention, a guide rod similar to that referred to, fastened to a lens mount and extending rearwardly therefrom parallel to the optical axis while being slidably and nonrotatably held in internal bearing means of a lens barrel, coacts with a threaded member forming a coaxial rearward extension thereof, this member being nonrotatably held in the camera housing with freedom of axial displacement and being engaged by a threaded drive element such as a captive nut. The guide rod and its extension, which are relatively axially shiftable, are urged by biasing means such as a contractile spring into a predetermined relative axial position so as to constitute, in effect, a lost-motion link which converts a rotation of the drive element into an axial motion of the lens mount; such rotation is brought about by a reversible motor having a pinion in mesh with gear teeth of the drive element, preferably with interposition of a slipping clutch as in the system of the Holderbaum application. A manually rotatable setting ring, carried on the lens barrel in an axially fixed position, has a camming groove registering with an axially extending slot in the lens barrel, the shiftable lens mount being provided with a pin or similar radial projection which extends through the slot into engagement with the camming groove but is received therein with sufficient play to enable an axial shift of the lens mount by the motor independently of the position of the setting ring; conversely, the lens mount is axially entrainable via its projection by the setting ring against the force of the biasing means for the manual establishment of a selected focusing position.

In this way, as more fully explained hereinafter, the projection of the lens mount is held by the biasing means against an edge of the camming groove when the threaded extension of the guide rod is retracted by the drive motor, this edge defining one of the limits (usually the more remote one) of a selected distance range within which the lens mount can be displaced by operation of the motor. The extent of that range is determined by the width of the camming groove.

BRIEF DESCRIPTION OF THE DRAWING

The above and other features of my invention will now be described in detail with reference to the accompanying drawing the sole FIGURE of which illustrates, somewhat diagrammatically and in axial section, a motion-picture camera with a varifocal objective focusable by a mechanism according to my invention.

SPECIFIC DESCRIPTION

The camera shown in the drawing comprises a varifocal or zoom-type objective, generally designated 1, and a camera body, generally designated 2. The objective 1 is provided with a lens barrel 10 which projects from the camera housing 33 and is centered on an optical axis O. Also centered on this axis are several lens members constituting a positively refracting front component 3, two negatively refracting intermediate components 4, 5 and a stationary rear component 6; the latter, disposed outside lens barrel 10 within housing 33, consists of a plurality of lenses not illustrated individually.

As is well known per se, an axial shifting of the second component 4 changes the focal length of lens assembly 3 - 6 and must be accompanied by a compensatory displacement of the third component 5 in order to keep the image plane of the objective coincident with the sensitive surface of a film 7. The concurrent shifting of components 4 and 5 is brought about by the rotation of a sleeve 34, provided for this purpose with a knob 35, which has camming grooves 31, 32 engaged by respective pins that pass through an axially extending slot 36 of the lens barrel 10 and are rigid with their respective lens mounts 37, 38. The lens mounts are slidably supported by axially extending guide rods not shown.

Front component 3, here shown as a compound lens, is provided with a lens mount 8 which is axially movable between an infinity position (full lines) and a closeup position (dot-dash lines), independently of lens mounts 37, 38, for focusing the objective upon an object to be photographed, either manually or automatically under the control of a conventional distance finder. Lens mount 8 is cantilevered on an axially extending guide rod 14 that is slidably and nonrotatably received in an inner annular flange 26 of lens barrel 10 and has a rear extremity sliding in a bore 19 of an extension member 18 which is guided in a bearing block 27 forming part of a rear wall 28. A transverse pin 20 of guide rod 14 engages in an axial slit 39 of member 18 to prevent relative rotation of the two relatively axially shiftable members 14 and 18. Member 18 terminates beyond bearing block 27, thus within camera housing 33, in a threaded stem 21 matingly engaged by a captive nut 22 which is held against axial displacement by the block 27 and by an extension 28' of end wall 28. A tension spring 16, anchored to rod 14 at 16 and to member 18 at 17, tends to contract the extensible link 14, 18 by urging these members into a limiting position in which the end of rod 14 abuts the bottom of the bore 19.

Nut 22 carries external gear teeth in mesh with a pinion 23 driven, via a slipping clutch 24, by a reversible electric motor 25 which is energizable (e.g. as described in my commonly owned U.S. Pat. No. 3,165,044) from a nonillustrated power supply. The automatic displacement of lens mount 8 by motor 25 via nut 22 and lost-motion connection 14-21, under the control of the aforementioned distance finder for example, is limited by the edges of a camming groove 13 formed in a milled setting ring 12 which is held against axial displacement on the front end of lens barrel 10, the groove 13 being engaged by a pin 9 on lens mount 8 penetrating an axially extending slot 11 of the lens barrel. With motor 25 arrested in a position in which member 18 is retracted to tension the spring 15, pin 9 is held against the rear edge of groove 13. Manual rotation of setting ring 12 thus establishes the remote limit of a distance range within which fine focusing can be carried out automatically. Ring 12 is provided with a distance scale (not shown) coacting with a stationary pointer.

In order to hold the lens mount 8 against rotation, and to prevent jamming or canting, I provide that lens mount with an ancillary guide rod 29 also slidable in flange 26 and terminating short of end wall 28. The two parallel rods 14 and 29 are fixedly interconnected, inside lens barrel 10, by a bracing ring 30 fastened to the rear end of rod 29 by a screw 35 and frictionally fitted onto an intermediate portion of the driven guide rod 14. It will be observed that ring 30 lies between the cam tracks 31 and 32 of components 4 and 5 so as not to interfere with their displacement by sleeve 34. Such a precaution, however, will not be necessary if the shifting of these components for zooming purposes is controlled by a camming sleeve of smaller diameter lodged inside ring 30. In either case, lens mount 8 forms with the two diametrically opposite rods 14 and 29 as well as ring 30 a rigid cage insuring precise axial movement of component 3 upon rotation of drive 22 or setting ring 12.

With pinion 23 of smaller diameter than nut 22, a favorable transmission ratio exists between motor 25 and guide rod 14 so that the frictional resistance encountered by the motor is small, its energy consumption is low and precise focusing is possible, e.g. under the control of an electronic comparator measuring contrasts between adjacent image points against a locally generated reference parameter. Other known distance meters usable for automatic focusing control operate with emitters of infrared radiation or radar pulses and corresponding receivers on the camera.

Though the combination of manual and automatic adjustability of lens mount 8 by setting ring 12 and drive motor 25 makes available a large focusing range, it may be desirable to restrict that range in certain positions of the zooming-control sleeve 34. Thus, focusing upon nearby objects may not yield sharp images with larger focal lengths. Sleeve 34 and ring 12 may therefore be provided with coacting formations, such as a lug 40 and a pin 41, limiting the excursion of front component 3 from its infinity position at the telephoto end of the varifocal range.

It will be apparent that more than a single component of an objective—possibly the entire lens assembly thereof—can be axially shifted for focusing purposes by the mechanism according to my invention.

I claim:

1. In a camera provided with a housing and an objective projecting forwardly from said housing, said objective including a lens barrel centered on an optical axis and a plurality of lenses in said lens barrel, at least one of said lenses being provided with an axially shiftable lens mount, the combination therewith of:

stationary bearing means in said lens barrel;

a guide rod slidably and nonrotatably held in said bearing means, said guide rod being fastened to said lens mount and extending rearwardly therefrom parallel to said optical axis;

a threaded member forming a coaxial rearward extension of said guide rod nonrotatably held in said housing with freedom of axial displacement, said guide rod and said member being relatively axially shiftable;

a threaded drive element matingly engaging said member, said element being provided with gear teeth and being held against axial displacement in said housing;

a reversible motor provided with a pinion in mesh with said gear teeth;

a manually rotatable setting ring carried on said lens barrel in an axially fixed position, said setting ring being provided with a camming groove registering with an axially extending slot in said lens barrel, said lens mount being provided with a projection extending through said slot into engagement with said camming groove; and biasing means urging said guide rod and said member into a predetermined relative axial position, said camming groove and said slot receiving said projection with sufficient play to enable an axial shift of said lens mount by said motor independently of the position of said setting ring, said lens mount being axially entrainable by said setting ring via said projection against the force of said biasing means.

2. The combination defined in claim 1 wherein said biasing means comprises a contractile spring anchored to said guide rod and to said member, said spring holding said projection onto a rear edge of said camming groove in a retracted position of said member.

3. The combination defined in claim 1 wherein said element is a captive nut.

4. The combination defined in claim 1, further comprising a slipping clutch interposed between said motor and said pinion.

5. The combination defined in claim 1, further comprising an ancillary rod parallel to said guide rod and shorter than the latter, said bearing means including an internal annular flange of said lens barrel close to said lens mount, said ancillary rod being slidably guided in said flange.

6. The combination defined in claim 5, further comprising annular bracing means rigidly connecting the rear end of said ancillary rod with a portion of said guide rod ahead of said member.

7. The combination defined in claim 1 or 2 wherein said one of said lenses is part of a front component of the objective, said lenses further forming additional components provided with control means for axially shifting same to vary the focal length of the objective.

8. The combination defined in claim 7 wherein said control means and said setting ring are provided with coacting formations limiting the displaceability of said lens mount in certain positions of said additional components.

* * * * *